F. A. FAUGHT.
APPARATUS FOR MEASURING AND INDICATING BLOOD PRESSURE.
APPLICATION FILED JULY 27, 1908.
917,276.
Patented Apr. 6, 1909.
2 SHEETS—SHEET 1.
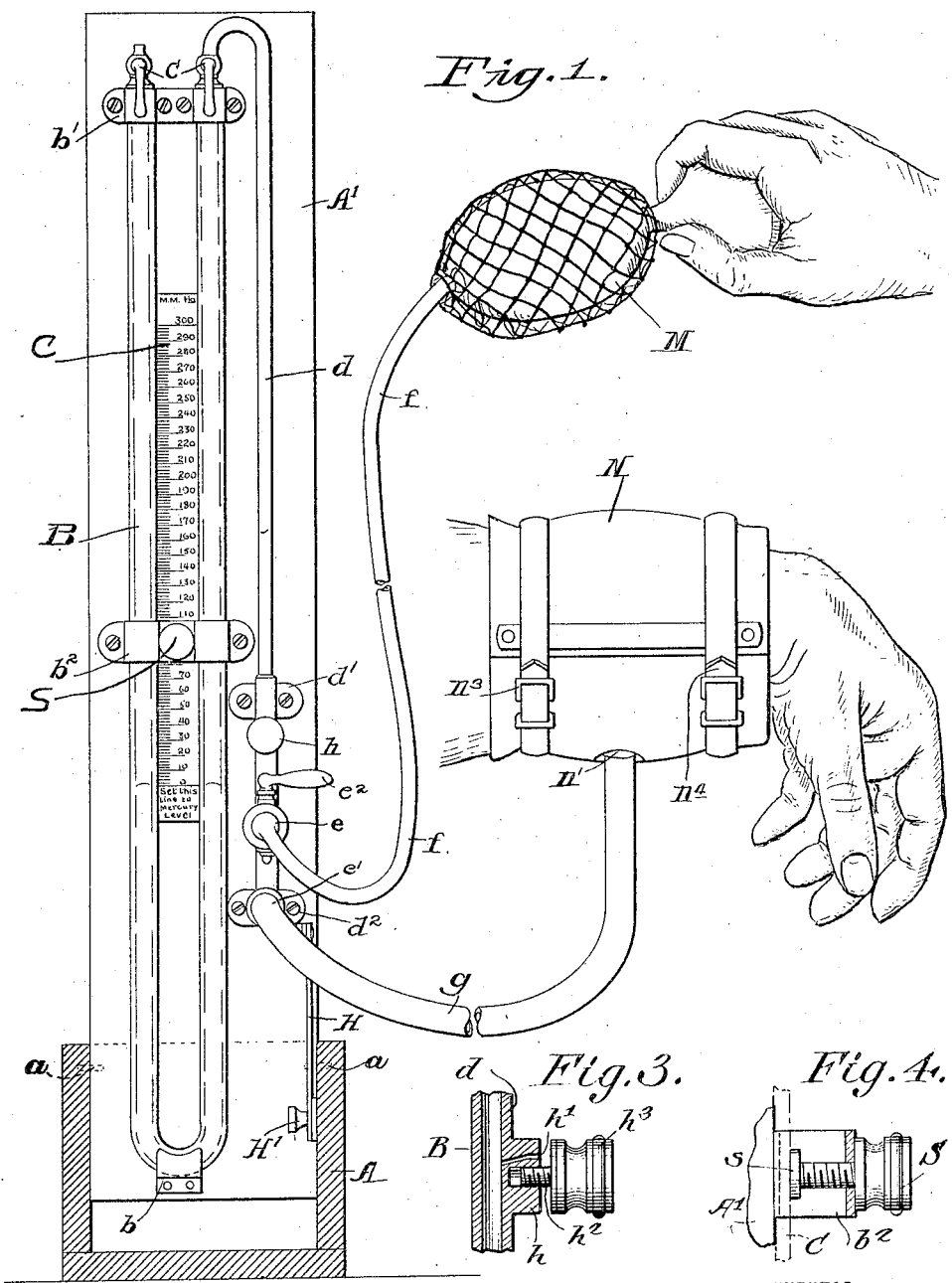

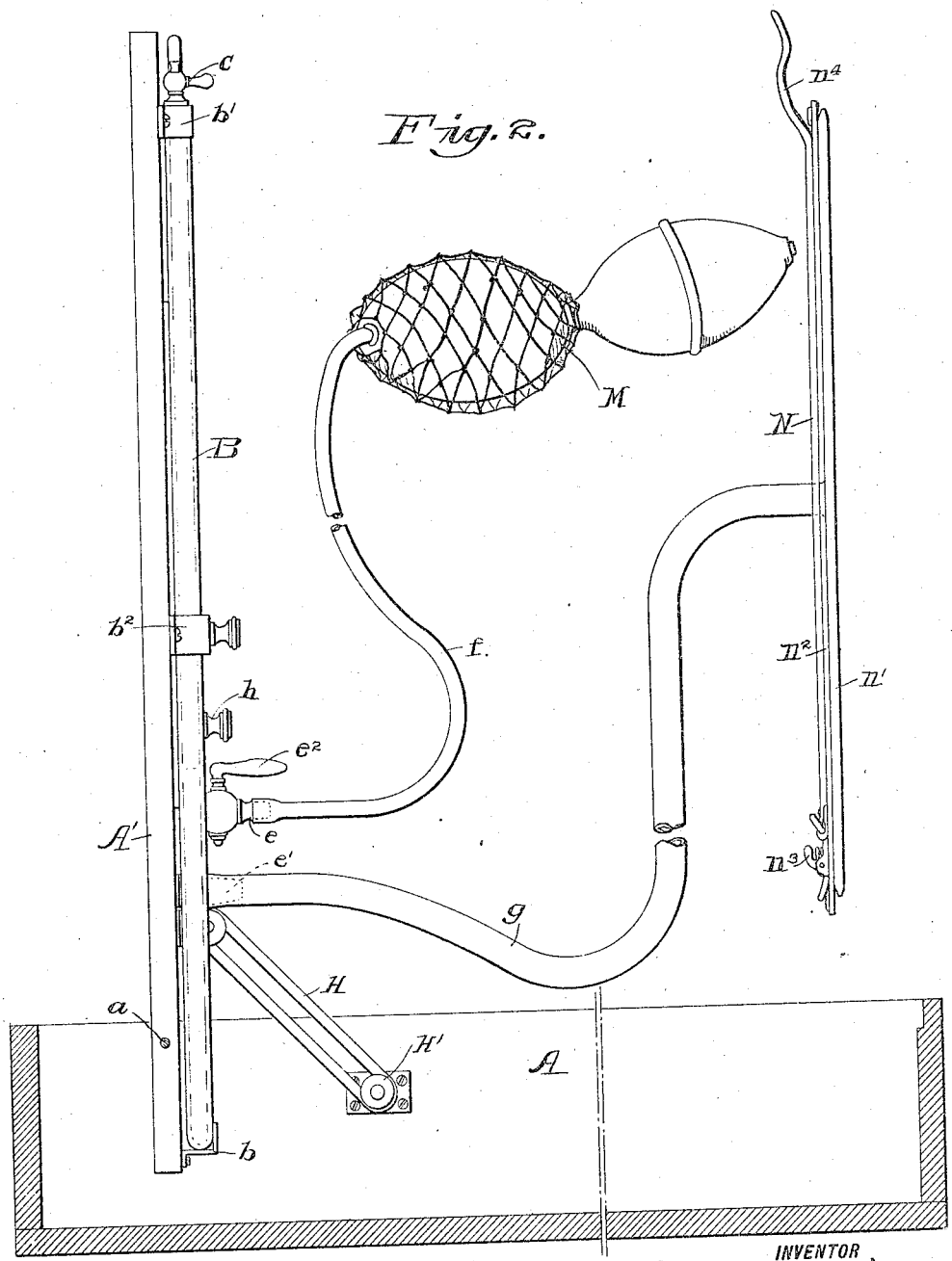

UNITED STATES PATENT OFFICE.

FRANCIS ASHLEY FAUGHT, OF PHILADELPHIA, PENNSYLVANIA, ASSIGNOR TO GEORGE P. PILLING AND SON COMPANY, OF PHILADELPHIA, PENNSYLVANIA, A CORPORATION OF PENNSYLVANIA.

APPARATUS FOR MEASURING AND INDICATING BLOOD-PRESSURE.

No. 917,276.  Specification of Letters Patent.  Patented April 6, 1909.

Application filed July 27, 1908. Serial No. 445,530.

*To all whom it may concern:*

Be it known that I, FRANCIS ASHLEY FAUGHT, citizen of the United States, residing in the city of Philadelphia, State of Pennsylvania, have invented certain new and useful Improvements in Apparatus for Measuring and Indicating Blood-Pressure, of which the following is a full, clear, and exact description, reference being had to the accompanying drawings, forming a part of this specification.

My invention relates to apparatus for use in pathological diagnosis, for measuring and indicating the degree of blood pressure in any artery of the human body to which a tourniquet may be applied, to determine it as a clinical factor in aid of correct diagnosis, prognosis and treatment, especially in cases of diseases of the blood and blood vascular system; apparatus of this type being some times called a sphygmomanometer.

My invention in such apparatus exemplifies the principle that if a closed pneumatic system, which comprises a mercury manometer at one end and a tourniquet or constriction device at the other adapted to make circular pressure upon a part of the human body, such as the fore arm, is arranged to receive, through appropriate means, an increasing air-pressure in the tubular connection between the mercury column and the tourniquet, until the pulse beat in the constricted limb is obliterated beyond the point of constriction, indicating thereby that the air-pressure in such pneumatic system is, under the condition stated, greater than the blood pressure in the artery back of the constriction, such pressure being ascertainable by reference to a scale marked on or operatively attached to said manometer, then, if said air-pressure is gradually released, through appropriate valvular means, from said tubular connection, such gradual reduction of pressure will be indicated on said manometer scale and will reach a point where it will exactly equal the blood pressure in the artery, determinable by the first pulse beat which can be felt beyond the gradually released constriction.

My invention is of an apparatus operating on this principle and consists of the several elements, in combination, hereinafter described; having as its primary object the exemplification of the principle stated and as its secondary object to provide a compact instrument with no detachable parts to be lost or broken; wherein the mercury in the manometer can be confined against exposure and loss when the instrument is not in use; wherein the millimeter scale is adjustable relatively to the manometer and to the mercury column therein, with increased facility in reading the diastolic reading; and finally wherein the instrument proper is operatively mounted on the inner face of the pivotally connected lid of a containing casing whereby the manometer and rigid tubular connections are suitably supported, in a vertical position while in use, and wholly contained within the casing when not in use, with the incidental results of decrease in weight and bulkiness and consequent portability, with increased facility in preparing the instrument for use.

In the accompanying drawings illustrating my invention:—Figure 1 is a front or end elevation, partly in section, with the lid of the casing in raised position. Fig. 2 a like side view; Fig. 3 is a longitudinal sectional view of the air-pressure releasing valve in the rigid tubular connection leading to and from the manometer; and Fig. 4 is a sectional view of the bracket and screw governing the adjustability of the sliding scale piece.

Referring now to said drawings, in which the containing casing is shown as open, with the lid raised and the instrument ready for use, the casing A is in the form of a rectangular box of sufficient length, width and depth to hold the manometer and adjunctive parts, and has a covering lid A' hinged near one of its ends, to the side walls of the box A, as at *a*, and furthermore is provided, between one or both of its said long sides or walls and those of the lid A', with a link brace H sliding on a thumb-screw H', whereby the lid can be supported, during the operation of the instrument, in a perpendicular position, at right angles to the base of the box, and maintained, removably, in that position, by tightening the thumb-screw.

Mounted on the inner face of the hinged lid or cover A' is a mercury manometer B consisting of a glass tube bent to a U-shape, with the open ends of the parallel arms pointing upward. The upper ends of the arms of the mercury tube are each governed, to open or to close them, by a stop-cock device, indicated at c. These preserve the mercury from exposure and prevent its escape from the manometer when the latter is in horizontal position due to the lowering of the hinged lid to close the casing when the instrument is not in operation.

The mercury manometer B is mounted fixedly on the inner face of the hinged cover or lid A' by means of a bracket b at its basal end, and by another bracket b' at its upper end of the two arms; aided intermediate its length by a thread bracket $b^2$ which also operates as an adjustable holding means, in connection with a thumb-screw S, to hold the pressure-scale board C, which is a thin narrow board on which is marked a pressure scale in millimeters, beginning with zero at the basal end and is to be adjusted initially to bring the zero mark opposite the normal level of the mercury in the manometer tube. The pressure scale board C is made of a width to fit snugly, but slidingly, between the two arms of the manometer tube, with its back resting against the supporting lid A', hence it is maintained in position by a frictional hold, yet free to be slid up and down for adjustment purposes, and when so adjusted may be held fixedly for the time being, by turning the thumb-screw S mounted on the bracket $b^2$. This screw S is shown in section in Fig. 4, and is preferably provided at its point with a rubber washer or head s to bear against the face of the scale C without scratching it. Other equivalent holding means as a substitute for screw S may however be employed, as is obvious.

The stop cocks c are to be turned to open position, when the lid is raised and the instrument put in operation; thereby leaving the end of the lefthand mercury column open to the atmosphere and the righthand column in communication only with the interior of the tubular fittings of the manometer. These fittings constitute an essential feature of the invented device and consist of a rigid metallic tubing d mounted on the face of the lid A' by a pair of brackets d', $d^2$. This rigid tubing d is provided at its extreme lower end with a nipple e' to which is attached a flexible tube g leading to a tourniquet or constriction device. Just above the nipple e', in the length of the rigid tubing d, it is provided with a stop cock $e^2$ carrying on its end a nipple e to which is attached another flexible tube f leading to a bellows; thus the rigid tubing d becomes the only means of tubular connection between the bellows, as a source of supply of air-pressure, the tourniquet as the means of applied constriction, and the mercury in the manometer tube; in other words constitutes a closed pneumatic circuit between those points, hence degrees of air-pressure applied, through the tourniquet, at the point of constriction, act directly on the mercury in the manometer tube and are indicated on the pressure scale accordingly. Any usual rubber bellows, such as indicated at M, is attached to the opposite end of the flexible tube f, to create the supply of air-pressure desired. A tubular rubber bandage, operating as a compressor or tourniquet, and indicated at N, is to be applied to the limb to be constricted and stop the flow of blood through it, and the compression is effected by air driven into the interior of this tubular bandage through the lower end of the rigid tube d from the bellows and its tube f through the nipple e. I prefer to make this constriction device N in a particular manner, namely, a flat strip of leather indicated at $n^2$ has mounted on its face, in the nature of a lining, an inflatable rubber bag, normally flat, indicated at n'. Loops and straps, such as $n^3$ and $n^4$ respectively, are provided to fasten the tourniquet in position around the arm or leg of the patient, with the inflatable bag against the surface of the limb, hence the inelastic outer strap $n^2$ exerts a binding pressure against the limb of the patient when its tubular lining is inflated, sufficient to stop the flow of blood and also prevents undue expansion of the inner elastic tube n' and consequent loss of attained pressure after the requisite inflation necessary to a complete constriction has been attained.

Having obtained and noted the air-pressure at which the flow of blood in the artery is stopped, it is essential to bring it into equilibrio with the natural pressure in the artery. This is attained by supplying the rigid tubular connection d at a point therein above the nipples e and e' with a sensitive valve indicated at h in Figs. 1 and 2. The stop cock $e^2$ on nipple e, governing the source of air-pressure supply, being closed, the needle valve h governs communication between the constriction tube and the manometer tube, as the only means of escape of air-pressure from both. A needle valve of any ordinary construction may be employed, but I prefer to use the form shown in section in Fig. 3, in which h' is an air-escaping passage, and $h^3$ a screw plug, carrying a screw $h^2$, the face of the plug normally bearing against the end of the air-passage in the valve body h. And the object in using a needle valve or other sensitive valve of the class is to effect a gradual rather than a quick release of the air-pressure in the manometer tube.

The operation of the instrument is as follows:—Opening the casing by its lid A' to perpendicular position (as seen in Fig. 2) brings the manometer B into operative position, in which it is temporarily supported by the link-brace H. The constricting device being then applied to the limb of the patient, the cocks $c$ and $e^2$ opened, the needle valve $h$ closed, and the bellows tube and the tourniquet tube being each attached to its appropriate nipple, on the metallic tubing $l$ of the manometer tube, the bellows is then operated to apply the constriction and also force air against the mercury in the manometer tube. When, by noting an obliteration of the pulse the operator has ascertained that constriction is complete, the cock $e^2$ on the tubular communication with the bellows is closed and the sensitive air-escape valve $h$ is opened to gradually allow an escape through it, of the accumulated pneumatic pressure, whereupon the mercury column will be acted on as also the constriction, and when the first pulse beat is felt by the operator the artery pressure will be in equilibrio with the air pressure in the manometer and the mercury level therein will be opposite a figure on the scale which will accurately indicate the systolic pressure in millimeters of mercury. The diastolic pressure may also be determined by the instrument, as will be obvious to persons skilled in the use of instruments of this class.

Having thus described my invention, I claim as new and desire to secure by Letters Patent:—

1. Apparatus for measuring and indicating blood pressure, comprising in combination a fluid manometer, a pressure scale, rigid tubular means in communication with the manometer fluid, a suitable supporting frame on which said elements are operatively mounted, a tourniquet and means to supply air pressure, with independent flexible tubular connections leading from the tourniquet and the source of air-pressure, respectively, to said rigid tubular means leading to the manometer, means to close the source of air pressure supply, and means to release the excess of air-pressure after constriction of the artery.

2. Apparatus of the character recited comprising in combination a supporting frame and a manometer operatively mounted thereon in perpendicular position, a pressure scale adjustably supported on said frame relatively to the manometer, rigid tubular means in direct communication with the manometer and mounted fixedly on said frame in parallelism with the manometer, a tourniquet and means to supply air under pressure, a flexible tubular connection between each of the same and said rigid tubular means, valvular means governing the air-supply tube, and a sensitive valve on said rigid tubular connection with the manometer.

3. Apparatus of the character recited comprising in combination a supporting frame and a U-shaped manometer operatively mounted thereon in perpendicular position, an air-pressure scale piece held slidingly between the arms of said manometer, means to adjustably hold the same, a rigid tubular manometer fitting mounted on said supporting frame in parallelism with the contiguous manometer tube, and in communication therewith, a tourniquet and a flexible tubular connection between the same and the basal end of said rigid tubular fitting, a nipple carrying a stop cock, on said fitting, means leading thereto adapted to supply air pressure, and a sensitive valve in said rigid tubular fitting operating to relieve the excess pressure in the pneumatic circuit after constriction of the artery has been completed, and bring it into equilibrio with the artery pressure.

4. Apparatus of the character recited comprising in combination a containing casing of rectangular form in planular outline, a lid pivoted near one of its ends to the said casing, means to operatively support the lid in a perpendicular position, a manometer tube fixedly mounted in vertical position on the face of said lid, valvular means governing the end of the manometer, a pressure-scale piece mounted vertically adjustable on said lid in appropriate relation to the manometer tube, a rigid tubular fitting mounted fixedly on said lid in parallelism with the contiguous manometer tube, a sensitive valve therein, a nipple on said fitting, a valve to govern it, a source of air-pressure supply with tubular means leading to said nipple, and a tourniquet with flexible tubular means between it and the rigid tubular fitting of the manometer.

5. Apparatus of the character recited comprising in combination a supporting frame, a manometer, rigid tubular fittings therefor and a pressure scale piece, said elements being mounted on said frame in contiguous and operative relation, a nipple with a cock governing the same, on said rigid tubular fitting, and means mounted on said nipple to supply air-pressure through the same, said tubular fitting being also provided with valvular means to discharge excess pressure therein, and another nipple, a flexible tube leading therefrom, and a constricting device operating as a tourniquet and consisting of a band of non-elastic material with a lining in the form of an elongated bag with the mouth of which said flexible tube communicates and means on said band adapted to detachably strap the device in operative position on the limb of the patient.

In testimony whereof, I have hereunto affixed my signature this 23rd day of July A. D. 1908.

FRANCIS ASHLEY FAUGHT.

Witnesses:
A. M. BIDDLE,
R. A. DUNLAP.